(12) United States Patent
Hirabayashi (10) Patent No.: US 11,502,611 B2
(45) Date of Patent: Nov. 15, 2022

(54) SWITCHING CIRCUIT, POWER SUPPLY APPARATUS, AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 16/894,289

(22) Filed: Jun. 5, 2020

(65) Prior Publication Data

US 2020/0395858 A1 Dec. 17, 2020

(30) Foreign Application Priority Data

Jun. 14, 2019 (JP) .............................. JP2019-110789

(51) Int. Cl.
| | |
|---|---|
| *H02M 3/335* | (2006.01) |
| *G05F 1/56* | (2006.01) |
| *G03G 15/00* | (2006.01) |
| *G05F 3/18* | (2006.01) |
| *H02M 1/00* | (2006.01) |

(52) U.S. Cl.
CPC .... *H02M 3/33576* (2013.01); *G03G 15/5004* (2013.01); *G03G 15/80* (2013.01); *G05F 1/56* (2013.01); *G05F 3/18* (2013.01); *H02M 1/0006* (2021.05)

(58) Field of Classification Search
CPC ... H02M 3/33576; H02M 1/0006; G05F 1/56; G05F 3/18; G03G 15/5004; G03G 15/80
See application file for complete search history.

(56) References Cited

U.S. PATENT DOCUMENTS

| | | | |
|---|---|---|---|
| 9,306,466 B2 * | 4/2016 | Hirabayashi | ............ H02M 1/44 |
| 9,343,985 B2 | 5/2016 | Hirabayashi | |
| 9,904,232 B2 | 2/2018 | Hirabayashi | |
| 10,264,185 B2 | 4/2019 | Hirabayashi | |
| 10,502,369 B2 | 12/2019 | Hirabayashi | |
| 10,541,613 B2 | 1/2020 | Hirabayashi | |
| 10,545,426 B2 | 1/2020 | Hirabayashi | |
| 2010/0134179 A1 * | 6/2010 | Bayerer | ............... H03K 17/567 327/538 |
| 2019/0191095 A1 | 6/2019 | Hirabayashi | |
| 2019/0379275 A1 | 12/2019 | Hirabayashi | |
| 2020/0119647 A1 | 4/2020 | Hirabayashi | |

FOREIGN PATENT DOCUMENTS

| | | |
|---|---|---|
| JP | 2005-78312 | 3/2005 |
| JP | 2005078312 A * | 3/2005 |

* cited by examiner

*Primary Examiner* — Jue Zhang
(74) *Attorney, Agent, or Firm* — Venable LLP (57) ABSTRACT

The switching circuit includes a first capacitor to which a pulse signal output from a control unit is input, a rectification circuit including at least a first diode and a second diode, the rectification circuit rectifying a voltage input from the first capacitor, and generating a first voltage, and a first switching element including a first terminal, a second terminal and a third terminal, the first voltage generated by the rectification circuit being applied between the first terminal and the second terminal.

11 Claims, 10 Drawing Sheets

SWITCHING CIRCUIT, POWER SUPPLY APPARATUS, AND IMAGE FORMING APPARATUS

BACKGROUND OF THE INVENTION

Field of the Invention

The present invention relates to a switching circuit, a power supply apparatus, and an image forming apparatus, and particularly relates to a driving method of a semiconductor switching element.

Description of the Related Art

Many semiconductor switching elements are used in modern electric circuits. Semiconductor switching elements includes elements such as a MOSFET, a bipolar transistor, a bidirectional thyristor (hereinafter called a triac), a photocoupler, and a solid state relay. These semiconductor switching elements are elements that can turn ON/OFF currents of multiple systems by applying a voltage or a current to a control terminal. Semiconductor switching elements have their respective characteristics. For example, since the triac can control a current that flows in both directions, the triac is suitable for turning ON/OFF of an alternate current. Since the primary and secondary sides of a photocoupler are electrically insulated, the photocoupler has a high safety, and the dielectric strengths of the primary and secondary sides are also high. A solid state relay can pass a high current as in a mechanical relay. Since there are various kinds of MOSFETs and bipolar transistors, and there are also many small size MOSFETs and bipolar transistors, which is advantageous in terms of cost, MOSFETs and bipolar transistors are widely used for turning ON/OFF of a small signal and low power.

Figure 10A:
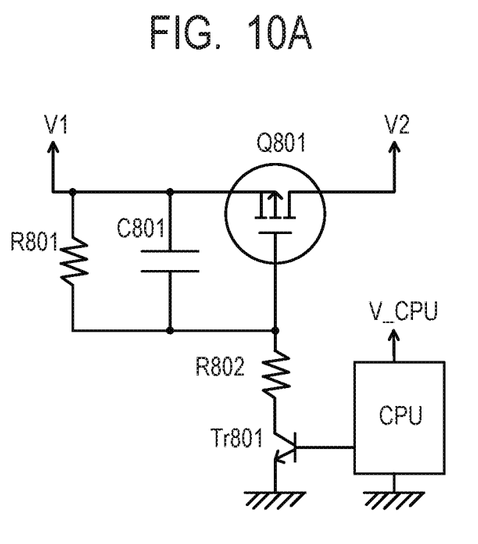
FIG. 10A, FIG. 10B and FIG. 10C are diagrams illustrating switching circuits of conventional examples.
Figure 10B:
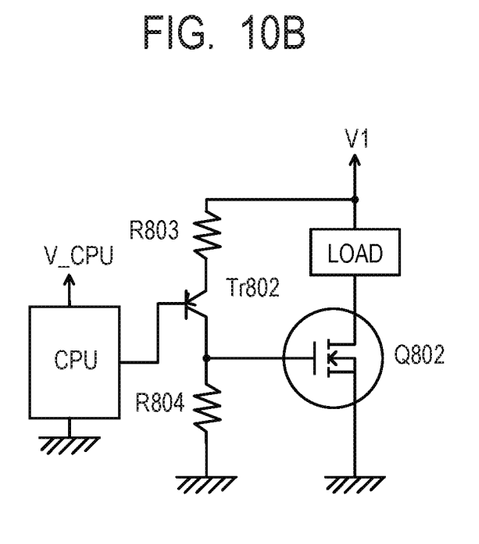
Figure 10C:
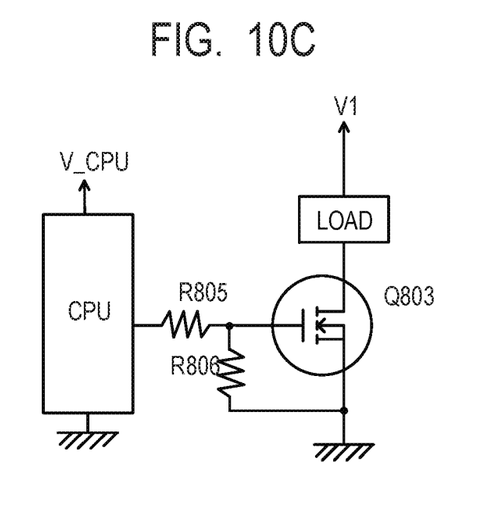

Three kinds of examples of a driving method of MOSFET by a control element such as a CPU are illustrated in FIG. 10A to FIG. 10C. FIG. 10A is an example of the driving method of a Pch MOSFET, which is used for turning ON/OFF of a current of an electric power system, i.e., which is used as a so-called load switch. FIG. 10B is an example of the driving method in a case where a voltage V1 can be directly driven by the CPU. FIG. 10C is an example of the driving method in a case where the voltage V1 is a high voltage that cannot be driven by the CPU. Additionally, for example, the method disclosed in Japanese Patent Application Laid-Open No. 2005-078312 exists as another example the driving method. Japanese Patent Application Laid-Open No. 2005-078312 discloses a load switch that is similar to the configuration of FIG. 10A, and that turns ON/OFF an arbitrary voltage from a power supply circuit by a Pch MOSFET, and an Nch MOSFET is further used for driving the Pch MOSFET. This is because the voltage supplied to a control element (hereinafter denoted as the CPU) such as a CPU, which is a control source, is different from the voltage at which the Pch MOSFET is turned ON/OFF. The object of Japanese Patent Application Laid-Open No. 2005-078312 is to automatically turn OFF the MOSFET when the CPU is in an abnormal state, and to stop electric power supply. In a case where the CPU is normal, a pulse signal is generated, a positive voltage is generated by integrating the pulse signal after performing capacitor coupling, and the positive voltage is applied to the gate terminal of the Nch MOSFET to render the drain-sources resistance in an ON state. When the CPU runs out of control or causes a failure, etc., and is in a state to output not a pulse signal but a simple high-level signal or a simple low-level signal, the gate voltage of the Nch MOSFET will fall, and the drain-sources resistance will be in an OFF state. A conventional example can be said as a method of turning ON/OFF a MOSFET by applying a gate voltage by utilizing another voltage source based on a source potential. However, these are methods that require at least three kinds of voltage sources (V1, GND, and V_CPU in FIG. 10A to FIG. 10C). Especially, in a case where the power supply voltage (V_CPU) of the CPU is greatly different from the voltage (V1) to be driven, another separate switching element is required for voltage conversion as in Japanese Patent Application Laid-Open No. 2005-078312, and FIG. 10A and FIG. 10B. Additionally, since a MOSFET Q803 is directly driven by the port output of the CPU in FIG. 10C, an element having a driving voltage (gate threshold value Vth) equal to or less than the power supply voltage of the CPU needs to be used as the MOSFET Q803. Since the method in Japanese Patent Application Laid-Open No. 2005-078312 also integrates the pulse signal of the CPU and directly uses it as the gate voltage, only a voltage equal to or less than the power supply voltage of the CPU is obtained, and an element having a low driving voltage must be used for the Nch MOSFET as in FIG. 10C. In a MOSFET, because of its structure, there is a tendency that the higher the drain-source breakdown voltage, the higher the driving voltage, and the driving voltages of many MOSFETs having several tens of breakdown voltage are equal to or more than 4V. Additionally, most of the above-described elements, such as a triac and a solid state relay, have high current capacities, and are over-engineered for applications such as high DC voltage and very weak current, and thus the cost efficiency is low. There are a few options for photocouplers having a breakdown voltage over hundreds of volts. These components cannot be technically substituted with MOSFETs, and even if these components can be substituted with MOSFETs, a circuit must be constructed by using a plurality of components, and the function of the above components must be substituted with the circuit as a whole.

SUMMARY OF THE INVENTION

One aspect of the present invention is a switching circuit including a first capacitor connected to a control unit, a pulse signal output from the control unit being input to the first capacitor, a rectification circuit including at least a first diode and a second diode, the rectification circuit rectifying a voltage input from the first capacitor, and generating a first voltage higher than a peak voltage of the pulse signal, and a first switching element including a first terminal, a second terminal and a third terminal, the first voltage generated by the rectification circuit being applied between the first terminal and the second terminal.

Another aspect of the present invention is a power supply apparatus including a control unit, a switching circuit including a first capacitor connected to the control unit, a pulse signal output from the control unit being input to the first capacitor, a rectification circuit including at least a first diode and a second diode, the rectification circuit rectifying a voltage input from the first capacitor, and generating a first voltage higher than a peak voltage of the pulse signal, and a first switching element including a first terminal, a second terminal and a third terminal, the first voltage generated by the rectification circuit being applied between the first terminal and the second terminal, the first switching element configured to be turned on or off by the control unit, a first power supply including a transformer having a primary winding and a secondary winding, and a rectifying and smoothing unit connected to the secondary winding, a first Zener diode group connected to the rectifying and smoothing unit, the first Zener diode group including a plurality of Zener diodes, and a second Zener diode group connected to the first Zener diode group in series, the second Zener diode group including a plurality of Zener diodes, wherein the third terminal is connected to a first connection point between the first power supply and a cathode terminal of the first Zener diode group so that a first output voltage is output from the first connection point, and wherein the second terminal is connected to a second connection point between the first Zener diode group and the second Zener diode group so that a second output voltage is output from the second connection point.

A further aspect of the present invention is a power supply apparatus including a switching circuit including a first capacitor connected to a control unit, a pulse signal output from the control unit being input to the first capacitor, a rectification circuit including at least a first diode and a second diode, the rectification circuit rectifying a voltage input from the first capacitor, and generating a first voltage higher than a peak voltage of the pulse signal, and a first switching element including a first terminal, a second terminal and a third terminal, the first voltage generated by the rectification circuit being applied between the first terminal and the second terminal, a second power supply including a transformer including a primary winding and a secondary winding, and a rectifying and smoothing unit connected to the secondary winding, and a Zener diode group connected to the rectifying and smoothing unit, the Zener diode group including a plurality of Zener diodes, wherein the second terminal is connected to a cathode terminal of the Zener diode group, and a third output voltage is output from a connection point between an anode terminal of the Zener diode group and the second power supply.

A further aspect of the present invention is a power supply apparatus including a switching circuit including a first capacitor connected to a control unit, a pulse signal output from the control unit being input to the first capacitor, a rectification circuit including at least a first diode and a second diode, the rectification circuit rectifying a voltage input from the first capacitor, and generating a first voltage higher than a peak voltage of the pulse signal, and a first switching element including a first terminal, a second terminal and a third terminal, the first voltage generated by the rectification circuit being applied between the first terminal and the second terminal, a third power supply including a transformer including a primary winding and a secondary winding, a switching element connected to the primary winding in series, and a start-up resistor for starting a switching operation of the switching element, wherein one end of the start-up resistor is connected to a beginning of the primary winding, and another end of the start-up resistor is connected to the third terminal, and wherein the second terminal is connected to a control terminal of the switching element.

A further aspect of the present invention is a power supply apparatus including a switching circuit including a first capacitor connected to a control unit, a pulse signal output from the control unit being input to the first capacitor, a rectification circuit including at least a first diode and a second diode, the rectification circuit rectifying a voltage input from the first capacitor, and generating a first voltage higher than a peak voltage of the pulse signal, and a first switching element including a first terminal, a second terminal and a third terminal, the first voltage generated by the rectification circuit being applied between the first terminal and the second terminal, a fourth power supply configured to convert AC voltage of an AC power supply to DC voltage, and to supply the DC voltage to a first load, and a fifth power supply configured to convert the AC voltage to DC voltage, and to supply the DC voltage to a second load, wherein the second terminal is connected to the AC power supply, and the third terminal is connected to the fourth power supply.

A still further aspect of the present invention is an image forming apparatus forming an image on a recording medium, the image forming apparatus including an image forming unit, and a switching circuit configured to switch an output voltage from a power supply apparatus for supplying electric power to the image forming apparatus, the switching circuit including a first capacitor connected to a control unit, a pulse signal output from the control unit being input to the first capacitor, a rectification circuit including at least a first diode and a second diode, the rectification circuit rectifying a voltage input from the first capacitor, and generating a first voltage higher than a peak voltage of the pulse signal, and a first switching element including a first terminal, a second terminal and a third terminal, the first voltage generated by the rectification circuit being applied between the first terminal and the second terminal.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Detailed Description of Driving Method of General MOSFET]

FIG. 10A, FIG. 10B and FIG. 10C are diagrams illustrating three kinds of circuit examples of the driving method of a Metal-Oxide-Semiconductor Field Effect Transistor (MOSFET) by a control element such as a CPU. In FIG. 10A to FIG. 10C, V_CPU is a voltage of, for example, 3.3V or 5V that is output from the power supply of the CPU. V1 is the voltage of a power supply system that outputs a voltage higher than V_CPU used in an electric instrument except for the CPU (V1>V_CPU). V2 is the output voltage from the power supply system turned ON/OFF by a MOSFET Q801, etc. The MOSFET Q801 is a Pch MOSFET. MOSFETs Q802 and Q803 are Nch MOSFETs. Driving circuits of the MOSFETs also include resistors R801 to R806, a capacitor C801, an NPN transistor (hereinafter, the transistor) Tr801, and a PNP transistor (hereinafter, the transistor) Tr802.

FIG. 10A is an example of the driving method of a Pch MOSFET, and the MOSFET Q801 turns ON/OFF of the current of the electric power system, i.e., the MOSFET Q801 is used as a so-called load switch. When the CPU turns ON the transistor Tr801, the voltage between V1 and the ground (hereinafter called the GND) is divided by the resistor R801 and the resistor R802, and a potential difference is generated between the gate and source of the MOSFET Q801. Accordingly, the MOSFET Q801 is in an ON state between the drain and the source. FIG. 10B and FIG. 10C illustrate circuits often used when driving an arbitrary load by an Nch MOSFET. When the voltage V1 is the voltage that can be directly driven by the CPU, connection is made as in FIG. 10B, and the transistor Tr802 is turned ON. Accordingly, the voltage V1 is divided by the resistor R803 and the resistor R804, the divided voltage is applied between the gate and source of the MOSFET Q802, and the MOSFET Q802 is electrically conducted between its drain and source. On the other hand, when the voltage V1 is a high voltage that cannot be driven by the CPU, and the driving voltage of the MOSFET Q803 is equal to or less than the power supply voltage of the CPU, connection is made as in FIG. 10C, and direct driving is performed.

Conventionally, when replacing a photocoupler, a relay, etc. that turns ON/OFF a power supply system having a potential different from the power supply system of a CPU with a MOSFET, it is necessary to use a plurality of semiconductor switches in terms of insulation, breakdown voltage, etc. Additionally, components of special specifications, such as high withstand voltage and low voltage driving, must be used.

[Circuit Configuration of Switching Circuit]

Figure 1:
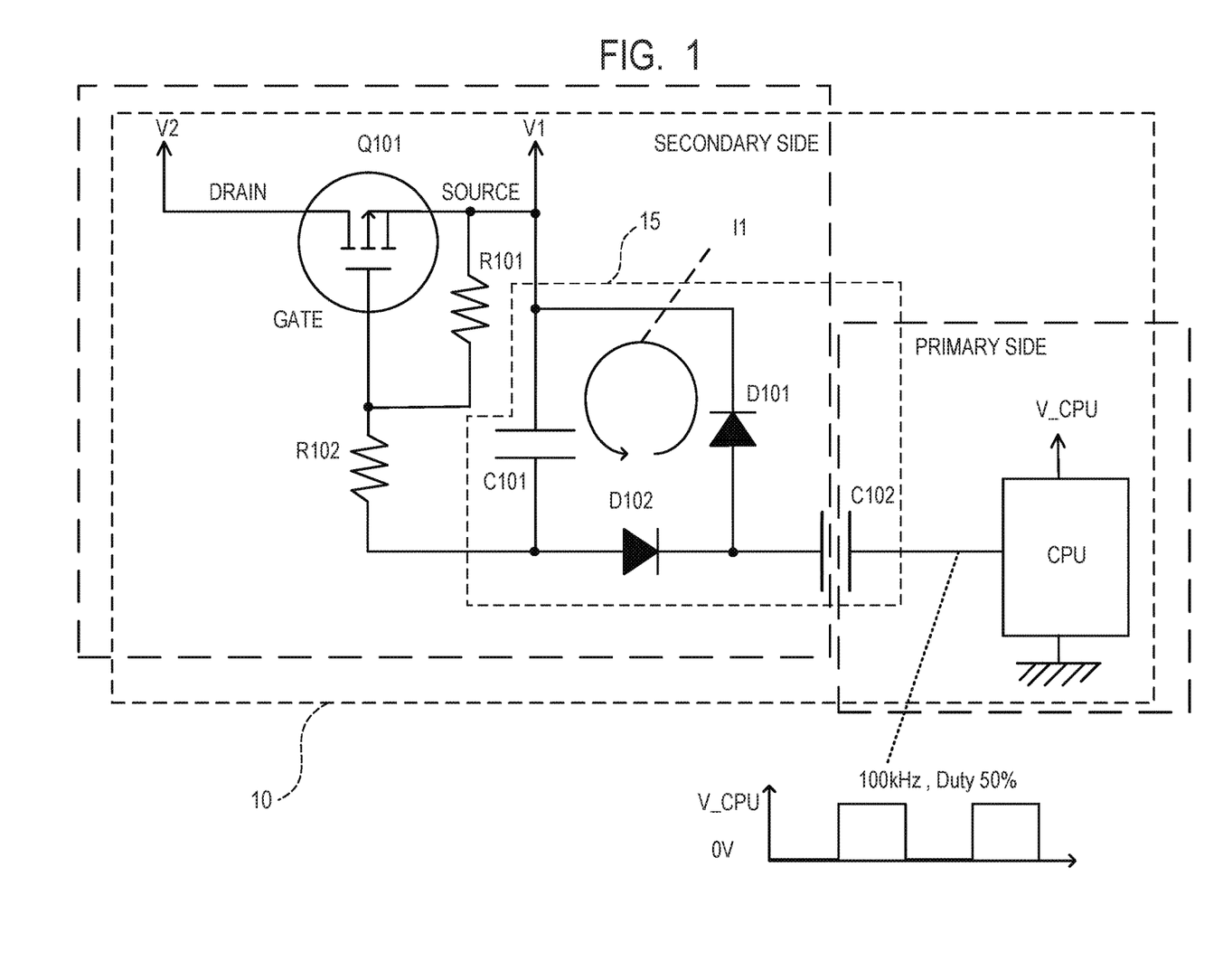
FIG. 1 is a diagram illustrating the configuration of a switching circuit of Example 1.

FIG. 1 is a diagram illustrating the circuit configuration of a switching circuit 10 of Example 1, and illustrates a so-called load switching circuit that turns ON/OFF an electric power system. Note that FIG. 1 also illustrates the waveform of a pulse signal transmitted in the path between a CPU and a capacitor C102. The switching circuit 10 includes an enhancement type Pch MOSFET (hereinafter called the FET) Q101, resistors R101 and R102, capacitors C101 and C102, and diodes D101 and D102. A power supply V_CPU is the power supply of the CPU, and is, for example, 3.3V or 5V. Note that the voltage that is output from the power supply V_CPU may be written as the voltage V_CPU. A power supply V1 is a power supply system that is used in an electronic instrument except for the CPU, and that outputs a voltage higher than the voltage V_CPU (V1>V_CPU). Note that the voltage that is output from the power supply V1 may be written as the voltage V1. A power supply V2 is a power supply system turned ON/OFF by the FET Q101. Note that the voltage that is output from the power supply V2 may be written as the voltage V2. For convenience of description, the primary side and the secondary side are divided in the capacitor C102, and are partitioned with a broken line illustrated in FIG. 1. Note that it is assumed that the side closer to the CPU (input side) from the capacitor C102 is the primary side.

The pulse signal output from the CPU is input to one end of the capacitor C102, which is a first capacitor. The other end of the capacitor C102 is connected to the anode terminal of the diode D101, which is a first diode, and is connected to the cathode terminal of the diode D102, which is a second diode. The cathode terminal of the diode D101 is connected to one end of the capacitor C101. The anode terminal of the diode D102 is connected to the other end of the capacitor C101. In the FET Q101, which is a first switching element, the source terminal, which is a second terminal, is connected to one end of the resistor R101, the gate terminal, which is a first terminal, is connected to the other end of the resistor R101 and one end of the resistor R102, and the voltage V2 is output from the drain terminal, which is a third terminal. The other end of the resistor R102 is connected to the other end of the capacitor C101.

The operation of the switching circuit 10 of Example 1 will be described. First, the CPU outputs a constant pulse signal to the capacitor C102. As illustrated in FIG. 1, the pulse signal output from the CPU has a voltage (that is, the peak voltage) of, for example, V_CPU at a high level, and 0V at a low level, and has the frequency of 100 kHz, the duty of 50%, etc. The AC component of the pulse signal output from the CPU passes through the capacitor C102, passes a forward current through the diode D102 at the falling edge portions of the pulse signal, and passes the forward current through the diode D101 at the rising edge portions of the pulse signal. That is, the current is generated in the direction indicated by I1 in FIG. 1. Then, the electric charge is biased in the capacitor C101, and a voltage is begun to be generated. Accordingly, the voltage divided by the resistor R101 and the resistor R102 is applied between the gate and source of the FET Q101, the FET Q101 is electrically conducted between its source and drain, and a current starts to flow toward the power supply V2 from the power supply V1. Since the lower the frequency of the pulse signal, the more significant the deterioration of the voltage by natural electric discharge, it is better if the frequency of the pulse signal is higher. However, since there is a possibility that a problem such as an electromagnetic radiation noise may occur in a case where the frequency of the pulse signal is too high, the minimum frequency capable of driving the FET Q101 may be selected.

The configuration of a portion including the capacitors C101 and C102, and the diodes D101 and D102 is known as a so-called voltage doubler rectifier circuit, and is called a rectification circuit 15. The rectification circuit 15 is used as a circuit that boosts the voltage by using an oscillation voltage, such as a transformer or a coil, as the source in a high voltage generating circuit. Example 1 is characterized by connecting the rectification circuit 15 between the FET Q101, which is the MOSFET to be driven, and the CPU, which is the control element (control device), thereby producing the following effects. The rectification circuit 15 outputs a first voltage higher than the peak voltage (voltage V_CPU) of the pulse signal output from the CPU.

As an effect (1), in the circuit of FIG. 1, the primary side and the secondary side are galvanically separated by the capacitor C102. Therefore, the voltage of the power supply V1 is not directly applied to the CPU, and thus a driving element for voltage conversion is not separately required. As an effect (2), in the switching circuit 10 of FIG. 1, the GND is not required for driving the FET Q101. As an effect (3), since the rectification circuit 15 is included, a voltage equal to or more than the power supply voltage (the power supply voltage (V_CPU) of the CPU) of the pulse signal for driving can be applied between the gate and source of the FET Q101. How these advantages are specifically applied will be described below.

First, with the effect (1), there is a possibility that the cost and the substrate area can be reduced. For example, in a case of FIG. 10A, which is a conventional example, when the power supply V1 is a power supply outputting 200V, a transistor having a breakdown voltage of 200V is required for the transistor Tr801. Since an element with a high withstand voltage also has a large chip size, and the cost is also high, it has been disadvantageous with respect to the cost and the substrate area. However, in the switching circuit 10 of FIG. 1, although the number of components is increased, since the capacitors C101 and C102, and the diodes D101 and D102 may just withstand the potential difference between the gate and source of the FET Q101, a component having a low breakdown voltage can be used. Many components having a low breakdown voltage have small chip sizes, and the cost is also low. Further, it is also advantageous in terms of options for components.

Next, as for the effect (2), not requiring the GND provides benefits that it can be applied to a place that does not have the GND nearby, and that it can be applied to a high voltage portion. For example, even in a case where the power supply V1 of FIG. 1 outputs 1000V, and the power supply V2 outputs 950V, an FET capable of withstanding 50 (=1000–950) V can be used as the FET Q101. In a case of the circuit as in FIG. 10A, it is necessary to use a transistor capable of withstanding 1000V at least for the transistor Tr801. In this manner, together with the effect (1), turning ON/OFF of the power supply system (power supply V1) different from the power supply system (power-supply V_CPU) of the CPU, which has conventionally been performed by a photocoupler or a relay, can be performed by using a general-purpose MOSFET, which is inexpensive and has many options.

Next, with the effect (3), a MOSFET having a gate threshold value of 4V or more, which is a high withstand voltage MOSFET in many cases, can be used. Accordingly, the options for components are increased, a component more suitable for required specification can be used, and the redundancy in cost and component size can be eliminated. Note that the capacitor C101 can be substituted with the use of the gate-source capacitance of the FET Q101, and the capacitor C101 can be omitted.

As described above, according to Example 1, the options for components used in the power supply apparatus can be increased, and simplification of the circuit and cost reduction can be achieved.

[Circuit Configuration of Switching Circuit]

Figure 2:
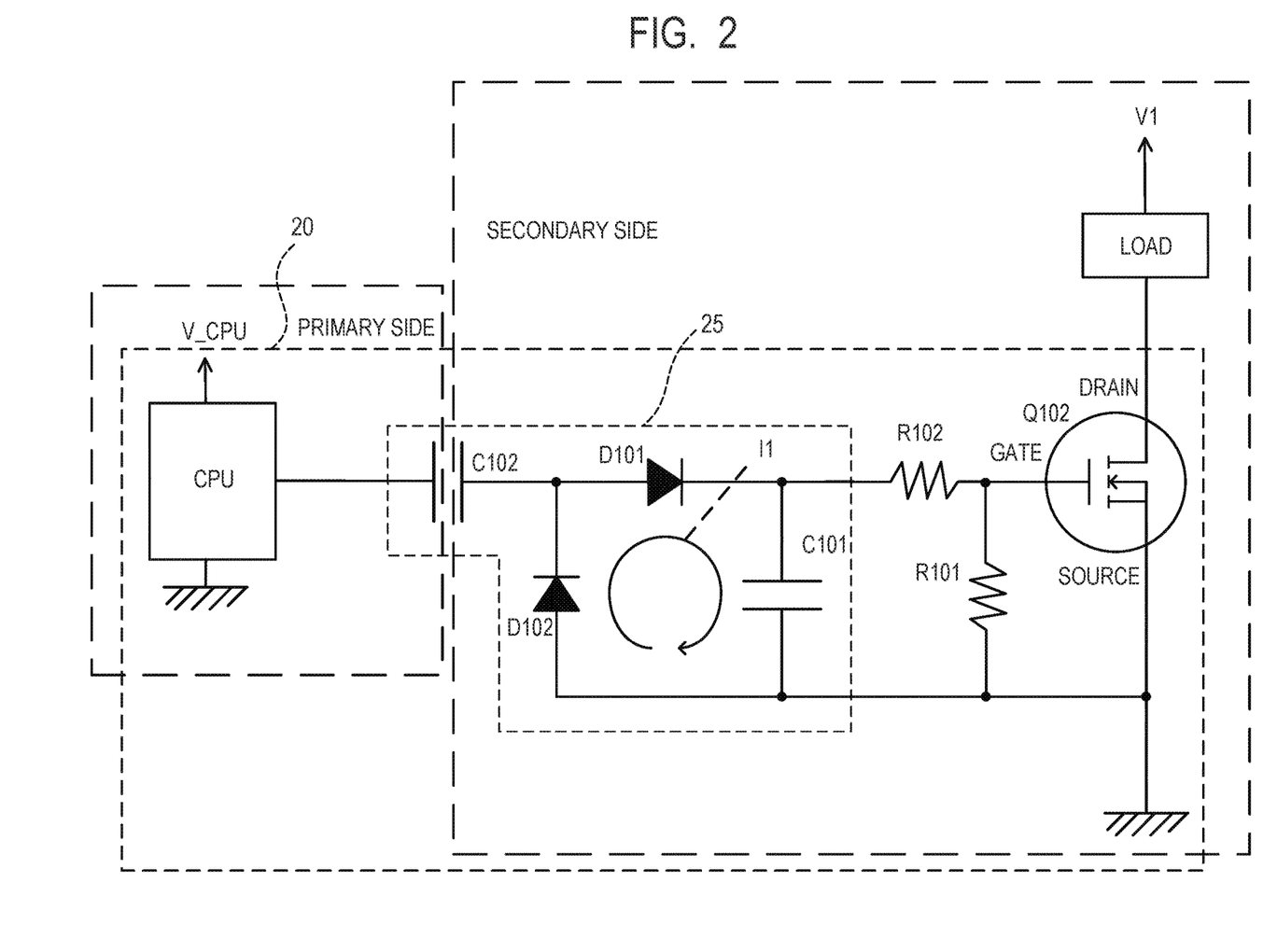
FIG. 2 is a diagram illustrating the configuration of a switching circuit of Example 2.

FIG. 2 is a diagram illustrating the circuit configuration of a switching circuit 20 of Example 2. While FIG. 1 illustrates the example using the Pch MOSFET, FIG. 2 illustrates an example using an enhancement type Nch MOSFET as a FET Q102. FIG. 2 illustrates a so-called source-grounded circuit, and illustrates the usage corresponding to the circuit of FIG. 10C described in BACKGROUND OF THE INVENTION. Since the circuit operation is the same as that in FIG. 1, the same numerals, etc. are used for the respective components.

The pulse signal that is output from the CPU is input to one end of the capacitor C102. The other end of the capacitor C102 is connected to the anode terminal of the diode D101, and is connected to the cathode terminal of the diode D102. The cathode terminal of the diode D101 is connected to one end of the capacitor C101. The anode terminal of the diode D102 is connected to the other end of the capacitor C101. In the FET Q102, the source terminal is grounded and is connected to one end of the resistor R101, the gate terminal is connected to the other end of the resistor R101 and one end of the resistor R102, and the drain terminal is connected to the power supply V1 via a load. The other end of the resistor R102 is connected to one end of the capacitor C101. A rectification circuit 25 includes the capacitors C101 and C102, and the diodes D101 and D102, and functions as a voltage doubler rectifier circuit.

Also in FIG. 2, a current is generated in the direction indicated by I1. In FIG. 10C, the element having the driving voltage equal to or less than the voltage V_CPU is required to be used for the FET Q803 for direct driving by the CPU. On the other hand, in the switching circuit 20 of FIG. 2 of Example 2, since the voltage V_CPU is boosted by the rectification circuit 25, which is a voltage doubler circuit, a MOSFET having a driving voltage of the voltage V_CPU or more can be used.

As described above, according to Example 2, the options for components used in the power supply apparatus can be increased, and simplification of the circuit and cost reduction can be achieved.

[Circuit Configuration of Switching Circuit]

Figure 3:
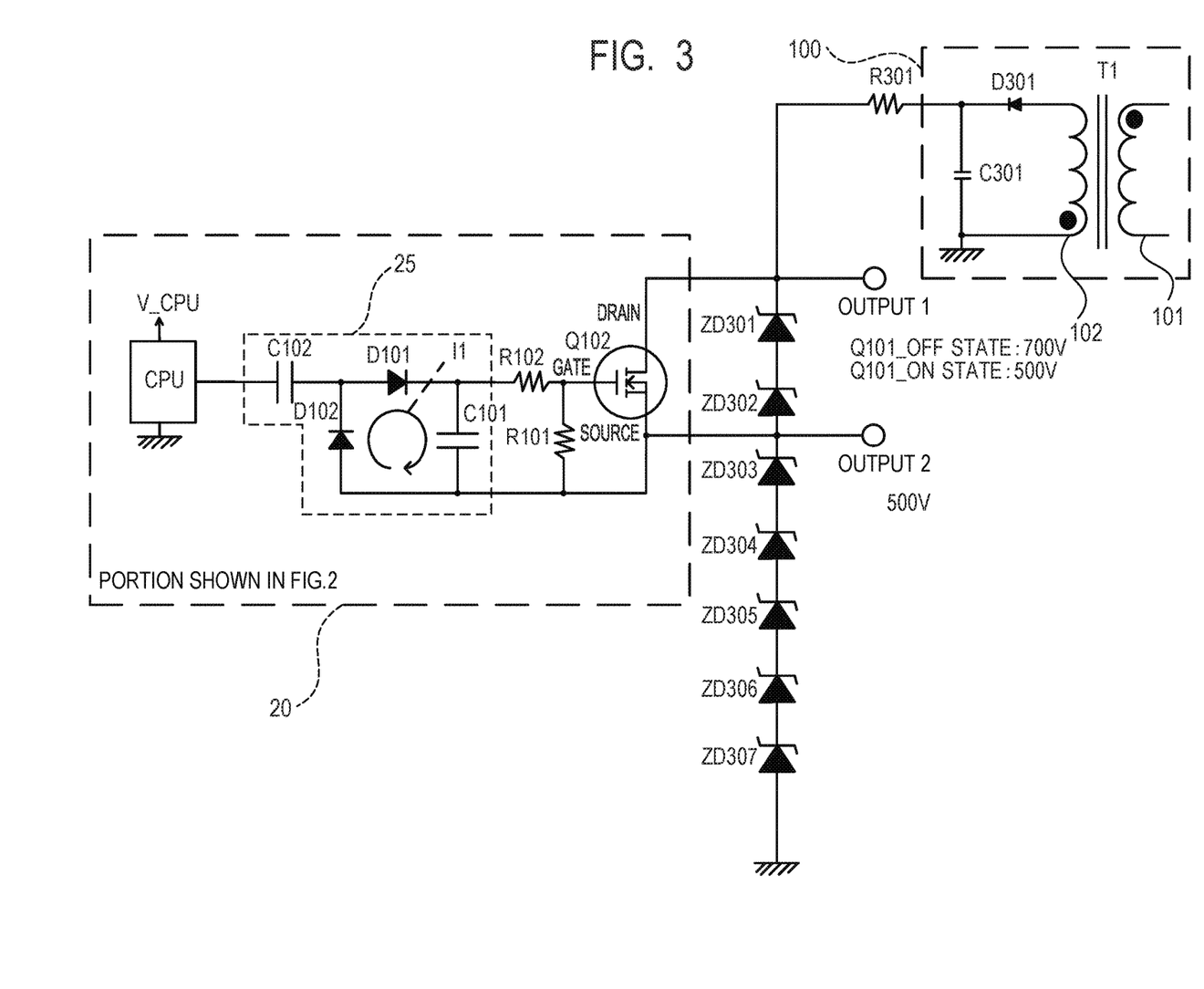
FIG. 3 is a diagram illustrating a power supply apparatus to which a switching circuit of Example 3 is applied.

FIG. 3 is a diagram illustrating a power supply apparatus of Example 3, and is a diagram illustrating the circuit configuration to which the switching circuit is applied. FIG. 3 illustrates an application example of the switching circuit 20 of FIG. 2. The power supply apparatus of FIG. 3 includes a power supply 100 including a high voltage transformer T1, a high voltage capacitor C301, and a diode D301, a resistor R301, and Zener diodes ZD301 to ZD307. The power supply 100 functions as a first power supply, and the diode D301 and the high voltage capacitor C301 function as a rectifying and smoothing device. The high voltage transformer T1 includes a primary winding 101 and a secondary winding 102. The Zener diodes ZD301 to ZD307 are Zener diodes having a Zener voltage (Vz) of, for example, 100V. Here, a first Zener diode group includes the Zener diodes ZD301 and ZD302. A second Zener diode group includes the Zener diodes ZD303 to ZD307. In the Zener diodes ZD301 to ZD307, the anode terminals and the cathode terminals are connected to each other in series. The power supply apparatus of Example 3 is a circuit that generates a high voltage, and outputs a constant high voltage to each of the portions indicated as an output 1 and an output 2, and is a circuit that has a function of changing the voltage of the output 1 with the control from the CPU.

The black dots of the transformer T1 represent the beginnings of windings. In the diode D301, the anode terminal is connected to the end of the secondary winding 102 of the transformer T1, and the cathode terminal is connected to one end of the high voltage capacitor C301. The other end of the high voltage capacitor C301 is grounded. One end of the high voltage capacitor C301 is connected to one end of the resistor R301. The other end of the resistor R301 is connected to the cathode terminal of the Zener diode ZD301. The anode terminal of the Zener diode ZD301 is connected to the cathode terminal of the Zener diode ZD302. The Zener diodes ZD302 to ZD307 are connected in similar manners, and the anode terminal of the Zener diode ZD307 is grounded. The cathode terminal of the Zener diode ZD301 is connected to the output 1, and the cathode terminal of the Zener diode ZD303 is connected to the output 2. In other words, the connection point between the first Zener diode group and the second Zener diode group is the output 2. From the above, in the power supply apparatus of FIG. 3, it can be said that the drain terminal of the FETQ102 is connected to a first connection point between the power supply 100 and the cathode terminal of the Zener diode ZD301, and the first connection point serves as the output 1, and outputs a first output voltage. Additionally, in the power supply apparatus of FIG. 3, it can be said that the source terminal of the FET Q102 is connected to a second connection point between the Zener diode ZD302 and the Zener diode ZD303, and the second connection point serves as the output 2, and outputs a second output voltage.

First, in a portion illustrated as the power supply 100 (corresponding to the power supply V1 of FIG. 1, etc.) indicated by a broken line (the primary side circuit is often omitted even in a case where a known circuit is used), a positive high voltage is generated. The current flowing out from the power supply 100 flows into the GND via the resistor R301 and the Zener diodes ZD301 to ZD307. Since the Zener voltage of the Zener diodes ZD301 to ZD307 is 100V, 700V is output at the output 1, and 500V is output at the output 2. Note that the difference between the voltage output by the power supply 100 and the voltage of the output 1 is carried by the resistor R301.

The switching circuit 20, which is illustrated as a portion shown in FIG. 2 by a broken line, is connected to the output 1 and the output 2. The switching circuit 20 is the same as that illustrated in FIG. 2, and the same numerals are also used. In FIG. 3, in a case where the FET Q102 is OFF (at the time of Q101_OFF), as described above, 700V is obtained at the output 1, and 500V is obtained at the output 2. On the other hand, in a case where the FET Q102 is turned ON (at the time of Q101_0N), a current is bypassed by the FET Q102, the output 1 and the output 2 have the same potential, and the output 1 will be 500V. Although this is the usage conventionally performed by a photocoupler, a relay, etc., by using the switching circuit 20 of FIG. 2 in this manner, these can be substituted with an Nch MOSFET, which is inexpensive and has many options.

The reason such usage is possible is that, as described in the effects (1) and (2) of Example 1, the voltage on the side of the CPU and the MOSFET is galvanically divided by the capacitor C102, and further, GND is not required. Specifically, the CPU operating at a low voltage of several V and the FET Q102 having a voltage range of 100V or more are separated because the capacitor C102 carries the voltage, and this portion plays a role of voltage conversion. On the other hand, the reason that the source-grounded circuit structure of the FET Q102 can be applied without connecting to the GNS is that the rectification circuit 25, which is a voltage doubler rectifier circuit, boosts the voltage from the source to gate of the FET Q102, and generates a driving voltage. Therefore, arbitrary potential can be taken as the source potential. It also means that elements to which the present invention are directed is not limited to Pch and Nch MOSFETs, and the present invention can also be applied to various elements as long as the elements are semiconductor switching element described in BACKGROUND OF THE INVENTION, such as a bipolar transistor, which is a current driving element.

As described above, according to Example 3, the options for components used in the power supply apparatus can be increased, and simplification of the circuit and cost reduction can be achieved.

[Circuit Configuration of Switching Circuit]

Figure 4:
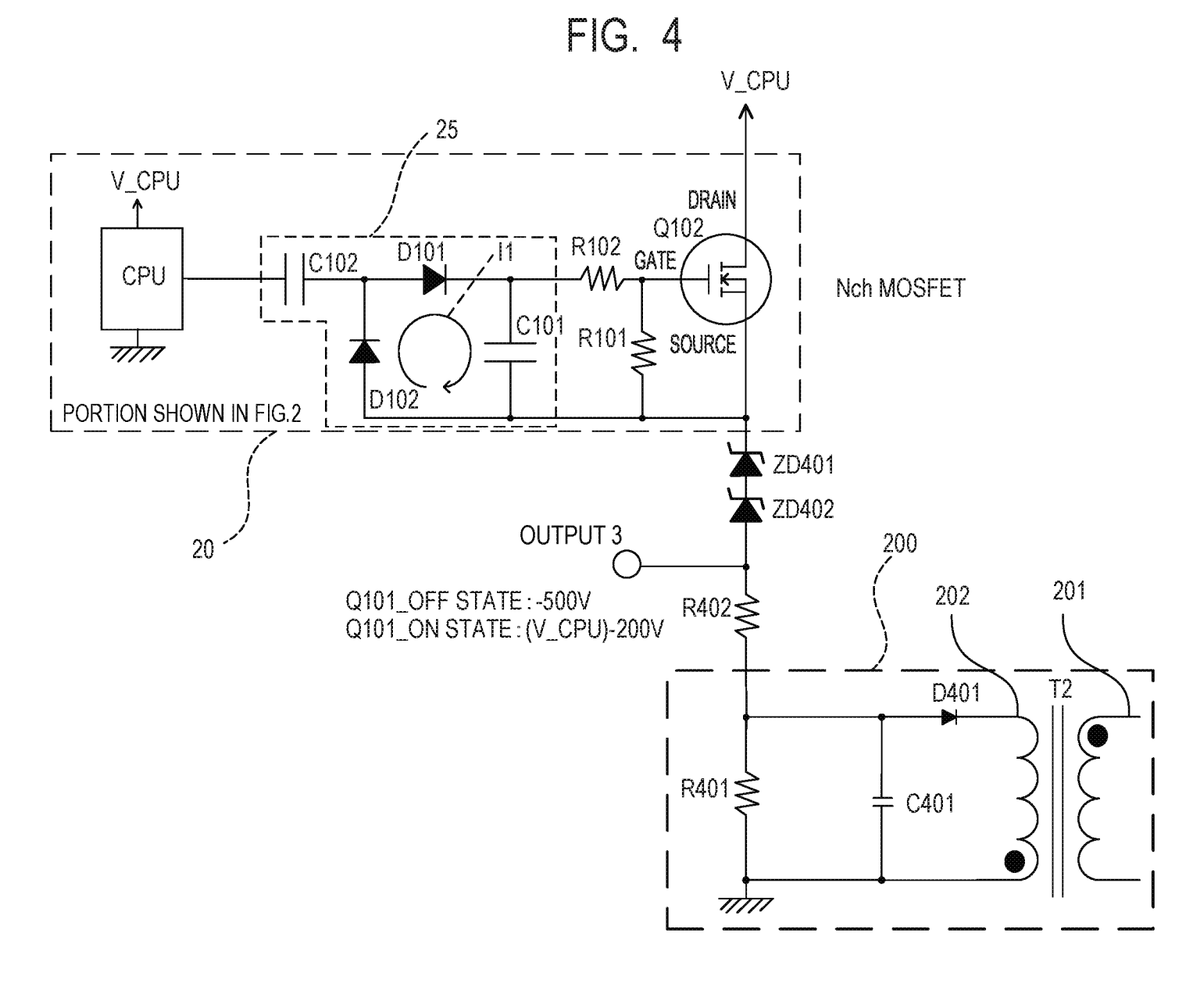
FIG. 4 is a diagram illustrating a power supply apparatus to which a switching circuit of Example 4 is applied.

FIG. 4 is a diagram illustrating a power supply apparatus of Example 4, is a diagram illustrating the circuit configuration to which the switching circuit is applied, and is an application example of the switching circuit 20 of FIG. 2. The power supply apparatus of FIG. 4 includes a power supply 200 including a high voltage transformer T2, a high voltage capacitor C401, a resistor R401, and a diode D401, a resistor R402, and Zener diodes ZD401 and ZD402. The power supply 200 functions as a second power supply, and the diode D401 and the high voltage capacitor C401 function as a rectifying and smoothing device. Each of Zener diode ZD401 and ZD402, which are included in a Zener diode group, is a Zener diode having a Zener voltage Vz=100V. The power supply apparatus of FIG. 4 is a circuit with a function of changing the voltage of a portion indicated as an output 3 into two values, i.e., −500V and (V_CPU)−200V, with the control from the CPU. Similar to Example 3 (FIG. 3), a portion corresponding to the switching circuit 20 of FIG. 2 is indicated by a broken line, and since the operation is the same, the same numerals are also used.

The transformer T1 includes a primary winding 201 and a secondary winding 202. In the diode D401, the cathode terminal is connected to the end of the secondary winding 201 of the transformer T1, and the anode terminal is connected to one end of the high voltage capacitor C401. The other end of the high voltage capacitor C401 is grounded. In the high voltage capacitor C401, one end is connected to one end of the resistor R401, and the other end is connected to the other end of the resistor R401. One end of the resistor R401 is connected to the other end of the resistor R402. One end of the resistor R402 is connected to the anode terminal of the Zener diode ZD402. The cathode terminal of the Zener diode ZD402 is connected to the anode terminal of the Zener diode ZD401. The cathode terminal of the Zener diode ZD401 is connected to the source terminal of the FET Q102. The connection point between the Zener diode ZD402 and the resistor R402 serves as the output 3. From the above, it can be said that the source terminal of the FET Q102 is connected to the cathode terminal of the Zener diode ZD401, the connection point between the anode terminal of the Zener diode ZD401 and the power supply 200 serves as the output 3, and is outputting a third output voltage.

First, the power supply 200 (the primary circuit is omitted) indicated by a broken line generates a voltage of −500V. Compared with the output voltage of the power supply 100 of Example 3 (FIG. 3), the output voltage of the power supply 200 has the reverse polarity. In a case where the FET Q102 is OFF, −500V, which is generated by the power supply 200, is directly output to the output 3. On the other hand, in a case where the FET Q102 is ON, a current flows from the power supply V_CPU via the FET Q102→the Zener diode ZD401→the Zener diode ZD402. Then, by making the resistor R402 carry the voltage, a voltage of (voltage V_CPU)−200V is output to the output 3. From the above, it can be said that a second voltage (V_CPU) having substantially the same potential as the peak voltage of the pulse signal is supplied to the drain terminal of the FET Q102, and the following control is performed by the CPU. That is, the CPU controls such that the voltage obtained by subtracting the sum of Zener voltages of the Zener diode group from the second voltage is the third output voltage, by turning ON the FET Q102. Additionally, the CPU controls such that the voltage output from the power supply 200 is the third output voltage, by turning OFF the FET Q102.

[Comparison with Conventional Example]

Figure 5:
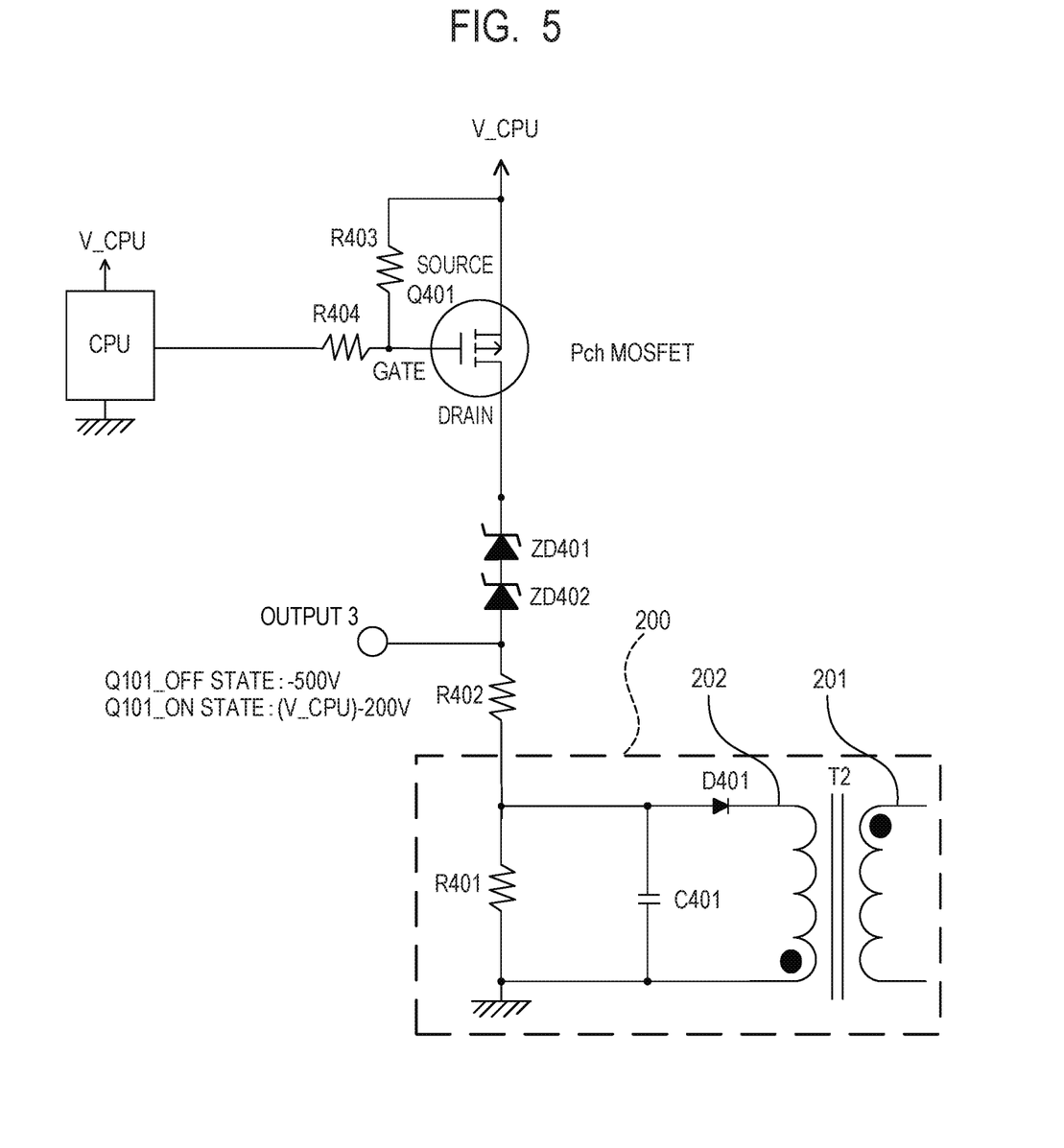
FIG. 5 is a diagram illustrating a power supply apparatus for comparison with Example 4.

Next, in order to describe the superiority of the present invention, FIG. 5 illustrates an example in a case where a circuit having the same specification (two values of voltage is output to the output 3) is made in a simplest manner, without using the present invention. The same numerals are used for members that are common to the members in FIG. 4. A conventional switching circuit illustrated in FIG. 5 includes resistors R403 and R404, and a FET Q401, and the FET Q401 is a Pch MOSFET. Since the output 3 has a negative voltage, it is necessary to use the Pch MOSFET. Additionally, although the number of components is fewer in FIG. 5, since the switching circuit does not have a voltage doubler rectifier circuit, it is necessary to use a Pch MOSFET having a high withstand voltage for the FET Q401. Generally, there are less lineups for Pch MOSFETs than for Nch MOSFETs. It is because the on-resistance is lower, and the switching speed is faster in Nch MOSFETs that uses electrons as the carriers, and there is more demand for Nch MOSFETs. Further, since the FETQ401 is directly driven by the CPU, the driving voltage needs to be equal to or less than the voltage V_CPU. For example, assuming that the voltage V_CPU is 3.3V, an element having a breakdown voltage of 500V or more, and having a driving voltage of about 2.5V must be chosen as the FET Q401. Since this is a very special specification, and many high withstand voltage MOSFETs have a driving voltage of 4V or more as previously mentioned, MOSFETs with such a specification rarely exist, and thus there are fewer options. In a case where there are a few options, even if there is a Pch MOSFET having a breakdown voltage of 500V and driven at 2.5V, since the current capacity and package size are over-engineered, it is difficult to optimize the cost. Additionally, in a case where the FET Q401 is short-circuited between its gate and drain due to a failure of a substrate or the FET Q401, there is a possibility that the CPU may also be broken by an excess voltage.

On the other hand, in the switching circuit 20 illustrated in FIG. 4, an Nch MOSFET can be used for the FET Q102, and further, an element having a driving voltage of 4V or more can also be used. Thus, since options for components are significantly increased, the cost can be optimized, and the concern for supply stability can be eliminated. Since the primary side and the secondary side are insulated by the capacitor C102, even in a case where an abnormality occurs, there is a low possibility that the CPU is also broken. It is very important to avoid these risks in designing a mass-produced product, and it can be said that the present invention is superior to conventional methods in that the risks can be avoided.

As described above, according to Example 4, the options for components used in the power supply apparatus can be increased, and simplification of the circuit and cost reduction can be achieved.

[Circuit Configuration of Switching Circuit]

Figure 6:
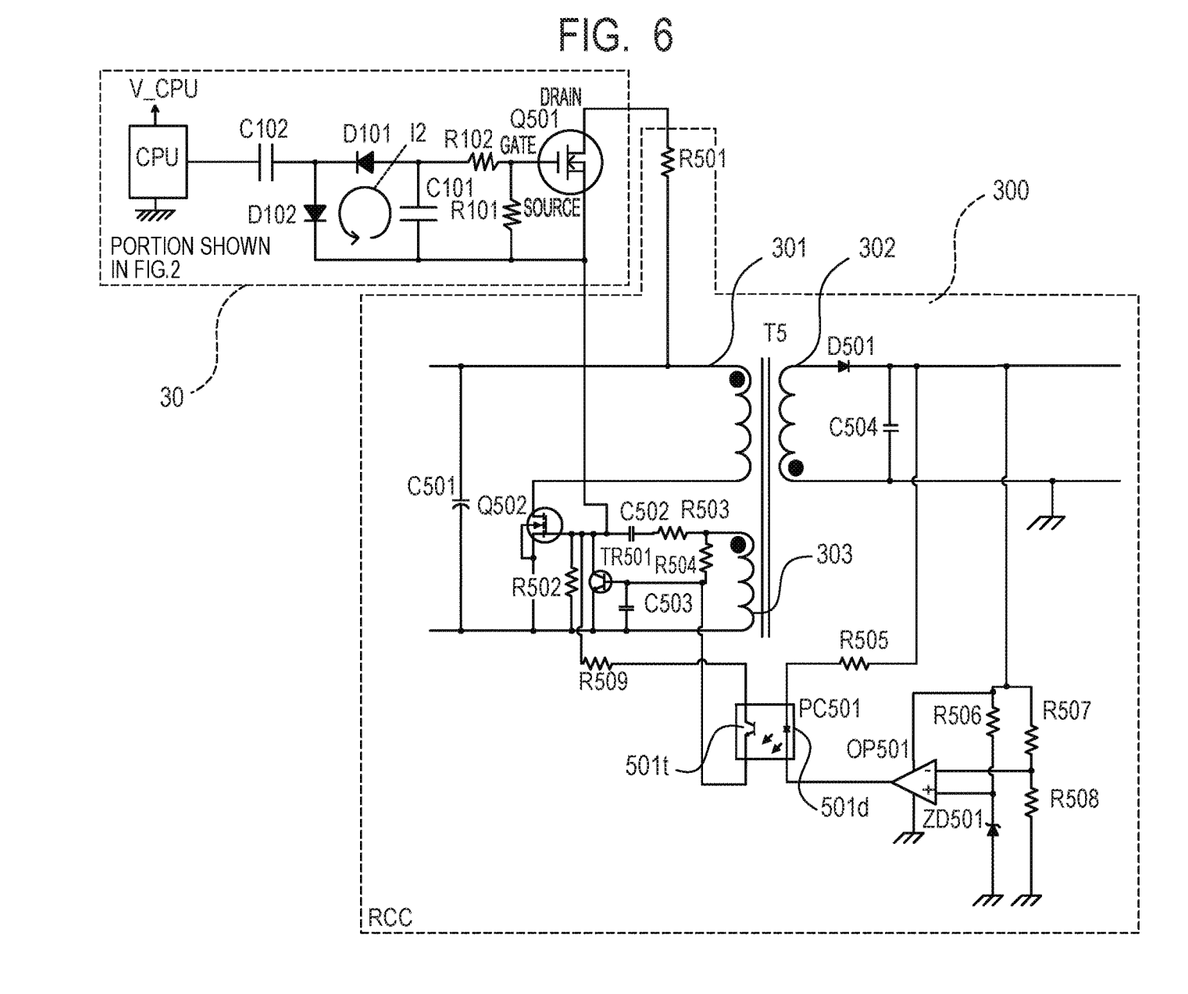
FIG. 6 is a diagram illustrating a power supply apparatus to which a switching circuit of Example 5 is applied.

FIG. 6 is a diagram illustrating a power supply apparatus of Example 5, is a diagram illustrating the circuit configuration to which the switching circuit is applied, and is an application example of the switching circuit 20 of FIG. 2, which will be denoted as a switching circuit 30. In FIG. 6, a power supply 300, which is a third power supply, includes a transformer T5, capacitors C501 to C504, a diode D501, and a Zener diode ZD501. The power supply 300 includes a FET Q501, a FET Q502, a bipolar transistor (hereinafter called the transistor) TR501, a photocoupler PC501, an operational amplifier OP501, and resistors R501 to R508. The resistor R501 is a start-up resistor. The transformer T5 is a flyback transformer. The FET Q501 is a depression type Nch MOSFET, and the FET Q502 is an enhancement type Nch MOSFET. The transistor TR501 is a bipolar transistor.

(Configuration of Power Supply 300)

The transformer T5 includes a primary winding 301, a secondary winding 302, and an auxiliary winding 303. In the primary winding 301 of the transformer T5, the beginning is connected to the drain terminal of the FET Q501 via the start-up resistor R501, and the end is connected to the drain terminal of the FET Q502. In the FET Q502, the source terminal is connected to a low voltage side of the capacitor C501, and the gate terminal is connected to the beginning side of the auxiliary winding 303 via the resistor R503 and the capacitor C502. The gate terminal (control terminal) of the FET Q502 is also connected to the source terminal of the FET Q501, and is connected to the start-up resistor R501 via the FET Q501. The resistor R502 is connected between the source terminal and gate terminal of the FET Q502. Additionally, the gate terminal of the FET Q502 is connected to the collector terminal of the transistor TR501, and the source terminal of the FET Q502 is connected to the emitter terminal of the transistor TR501. Voltage is induced in the secondary winding 302 by performing a switching operation of turning ON or OFF the FET Q502.

The base terminal of the transistor TR501 is connected to the beginning side of the auxiliary winding 303 via the resistor R504. The capacitor C503 is connected between the base terminal and emitter terminal of the transistor TR501. The base terminal of the transistor TR501 is connected to the emitter terminal of a primary side phototransistor 501t of the photocoupler PC501. The collector terminal of the primary side phototransistor 501t of the photocoupler PC501 is connected to the gate terminal of the FET Q502 via the resistor R509.

In the transformer T5, the end of the secondary winding 302 is connected to the anode terminal of the diode D501. The cathode terminal of the diode D501 is connected to one end of the capacitor C504. The other end of the capacitor C504 is connected to the beginning of the secondary winding 302. One end of the capacitor C504 is connected to the anode terminal of a secondary side photodiode 501d of the photocoupler PC501 via the resistor R505. One end of the capacitor C504 is grounded via the resistors R507 and R508. The voltage divided by the resistors R507 and R508 is input to an inverted input terminal (− terminal) of the operational amplifier OP501. One end of the capacitor C504 is grounded via the resistor R506 and the Zener diode ZD501. The cathode terminal of the Zener diode ZD501 is connected to a non-inverted input terminal (+ terminal) of the operational amplifier OP501. The output terminal of the operational amplifier OP501 is connected to the cathode terminal of the secondary side photodiode 501d of the photocoupler PC501.

Although the switching circuit 30 indicated by a broken line and illustrated as a circuit shown in FIG. 2 is basically the same as the switching circuit 20 of FIG. 2, the FET Q501 is changed to a depression type Nch MOSFET. Accordingly, in order to change the polarity of the voltage applied between the gate and the source, the directions of the diode D101 and the diode D102 are changed by 180 degrees from those in FIG. 2, and the direction I2 in which the current following the pulse signal of the CPU flows is also reversed. Since the operation is the same except for that, the same numerals are also used.

The power supply 300 indicated by a broken-line is a kind of self-excited AC/DC converter, which is called a so-called ringing choke converter (RCC). Since it is a general circuit, a detailed description is not given. This type of power supply requires a resistor called a start-up resistor that provides a gate voltage to the FET Q502 in order to turn ON the FET Q502, which is a switching element, when starting the operation, i.e., at the time of start-up. Although the start-up resistor R501 is not required after the RCC begins self-oscillation, since the start-up resistor remains to continue consuming electric power in a general RCC circuit, it has been disadvantageous in terms of energy saving.

Therefore, as in FIG. 6, by inserting the start-up resistor R501 in series in the switching circuit 30 corresponding to FIG. 2, the start-up resistor R501 can be activated/deactivated from the CPU, and wasting of a constant electric power can be eliminated by deactivating the start-up resistor R501 after starting up the power supply. In that case, if it is the same enhancement type MOSFET as that in FIG. 2, when the CPU is not operating, the FET Q501 is OFF, the voltage is not applied to the gate terminal of the FET Q502, and the power supply 300 (RCC) cannot be activated. Therefore, it is a mechanism of positively performing start-up of the power supply 300 (RCC) by adopting a normally-on depression type MOSFET for the FET Q501, and turning OFF the FET Q501 after starting up the CPU.

As described above, according to Example 5, the options for components used in the power supply apparatus can be increased, and simplification of the circuit and cost reduction can be achieved.

Figure 7:
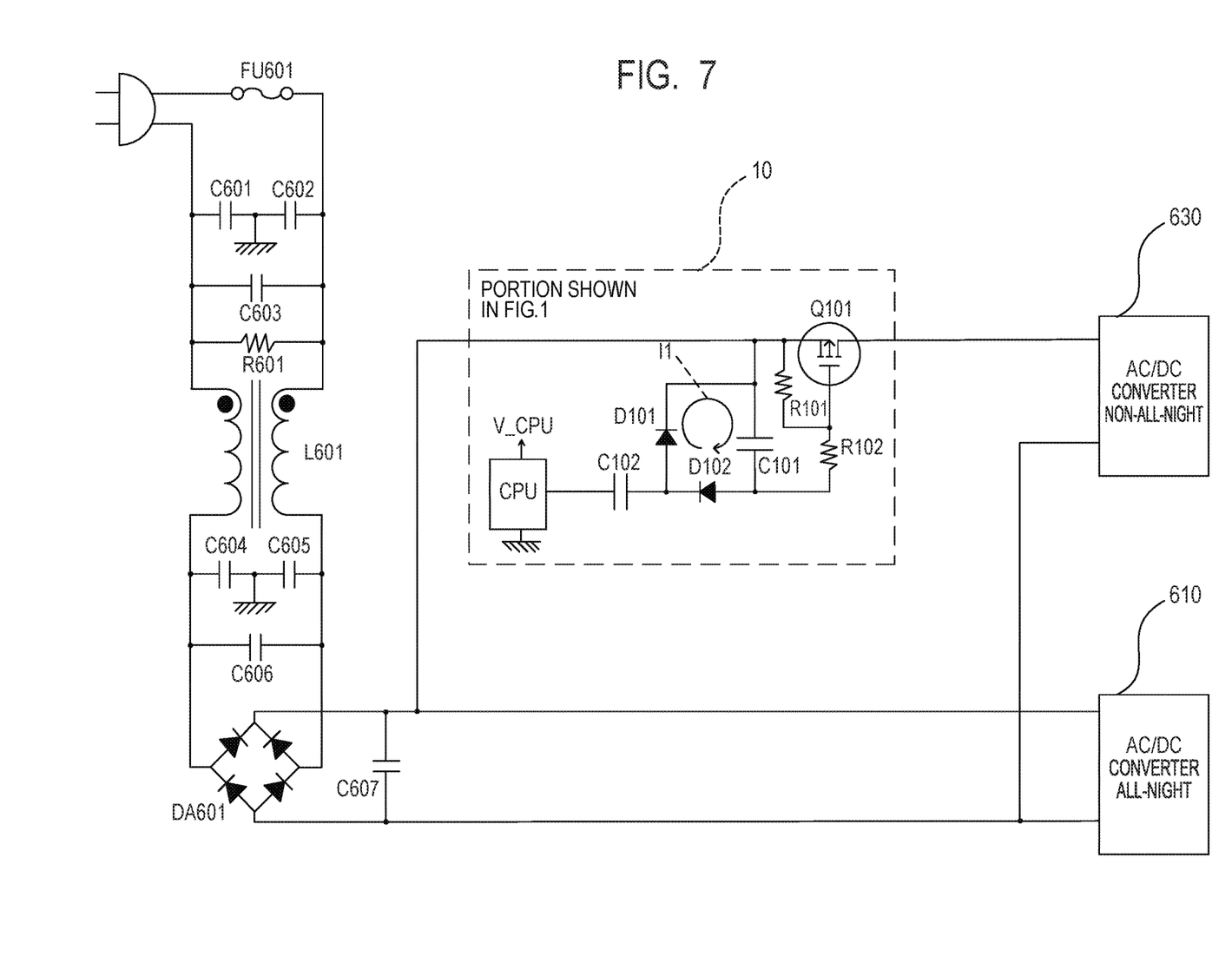
FIG. 7 is a diagram illustrating a power supply apparatus to which a switching circuit of Example 6 is applied.

FIG. 7 is a diagram illustrating a power supply apparatus of Example 6, is a diagram illustrating the circuit configuration to which the switching circuit is applied, and is a schematic diagram of an AC/DC converter portion from a receptacle plug of an instrument. A plurality of AC/DC converters for converting AC voltage to DC voltage are often mounted on a large-sized instrument. For example, there are an all-night power supply 610, which is a fifth power supply always supplying electric power to a CPU, etc., and a non-all-night power supply 630, which is a fourth power supply used only when a heavy load is operated. Conventionally, a triac, etc. has been used as a method of cutting off electric power supply to the non-all-night power supply 630. In Example 6, it is shown, an example in which the switching circuit 10 of FIG. 1 is applied to cut off the electric power supply to the non-all-night power supply 630, the example replaced with a MOSFET having a high versatility. Note that, in FIG. 7, the switching circuit 10 is horizontally flipped with respect to FIG. 1 for convenience of arrangement.

The operation will be briefly described. The receptacle plug is connected to an AC power supply, and AC voltage is supplied to a bridge diode DA601 via the receptacle plug. The AC voltage is rectified by being input to the bridge diode DA601, and is smoothed by a capacitor C607. Note that, in order to prevent a noise, etc., the following power source line filter, for example, a fuse FU601, across-the-line capacitors C603 and C606, line-bypass capacitors C601, C602, C604 and C605, a bleeder resistor R601, and a common mode choke L601, is connected to the upstream of the bridge diode DA601.

That is, AC voltage is converted to direct current in the capacitor C607, and turning ON/OFF of the electric power to the non-all-night power supply 630 is equal to the usage as the load switch in the switching circuit 10 of Example 1. Therefore, the switching circuit 10 of FIG. 1 can be applied as a load switch for turning ON/OFF the electric power supply to the non-all-night power supply 630. The circuit operation of the FIG. 1 portion is the same as that in Example 1, and thus it is omitted.

As described above, according to Example 6, the options for components used in the power supply apparatus can be increased, and simplification of the circuit and cost reduction can be achieved.

Figure 8:
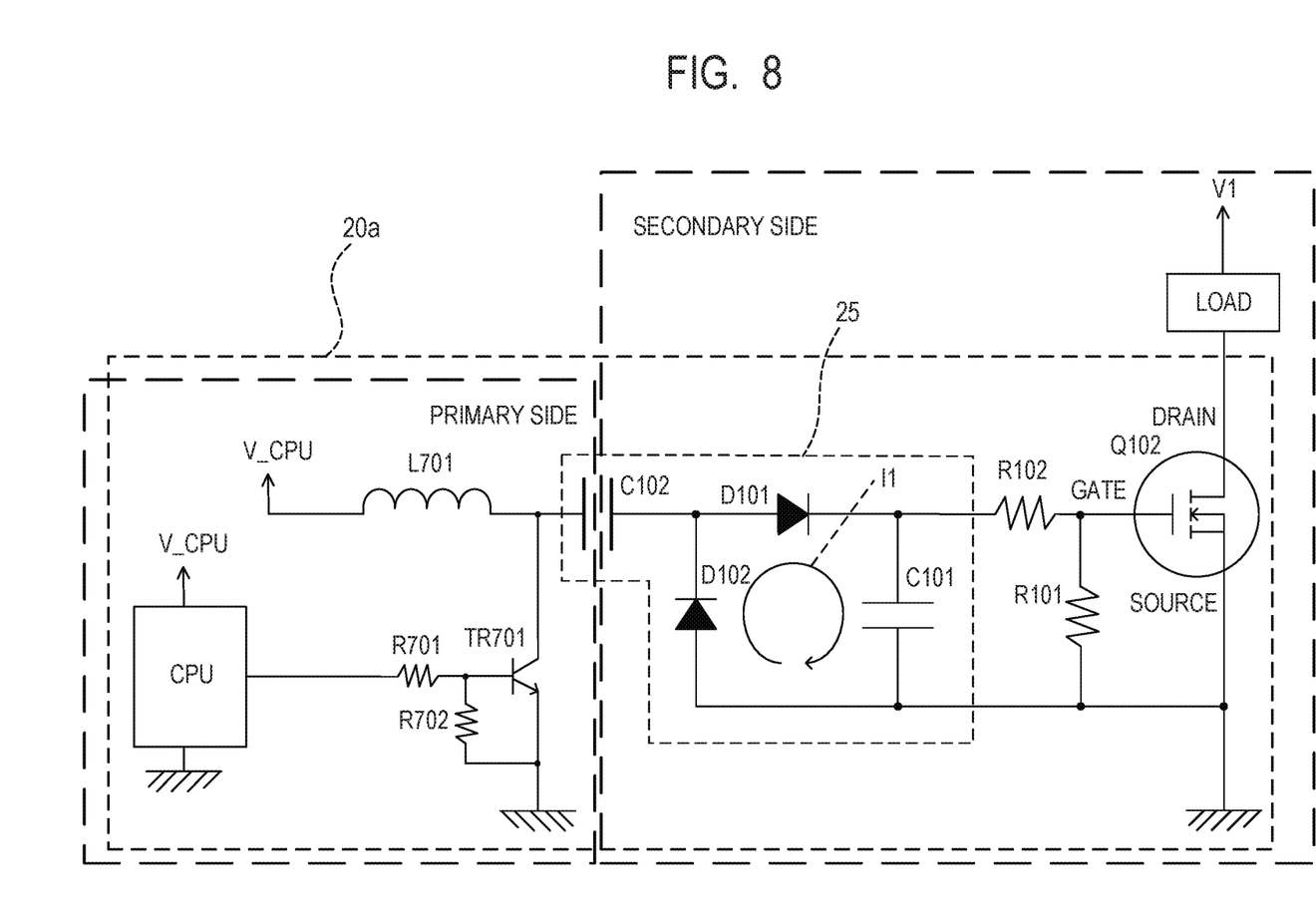
FIG. 8 is a diagram illustrating the configuration of a switching circuit of Example 7.

FIG. 8 is a diagram illustrating the circuit configuration of a switching circuit of Example 7, and Example 7 is an application example of the switching circuit 20 of Example 2, which will be denoted as a switching circuit 20a. Since the secondary side portion enclosed by the broken line in FIG. 2 is the same as the switching circuit 20 of FIG. 2, the same numerals as those in FIG. 2 are used, and a description will be omitted. Components newly added in FIG. 8 are an inductor L701, resistors R701 and R702, and a bipolar transistor (hereinafter called the transistor) TR701.

One end of the inductor L701 is connected to the power supply V_CPU, and the other end is connected to the anode terminal of the diode D101 and the cathode terminal of the diode D102. The collector terminal of the transistor TR701, which is a second switching element, is connected to the other end of the inductor L701, the base terminal is connected to the CPU via the resistor R701, and the emitter terminal is grounded. The resistor R702 is connected between the emitter terminal and the base terminal of the transistor TR701. Although the CPU directly inputs the pulse signal to the capacitor C102 in FIG. 2, the pulse signal is indirectly transmitted to the secondary side by the transistor TR701 in FIG. 8.

First, when the same pulse signal (100 kHz, Duty 50%, 0V or Vcc_CPU) as in Example 1 is output from the CPU, the transistor TR701 performs a switching operation according to the pulse signal. Accordingly, a current flows into the inductor L701, and when the transistor TR701 shifts from an ON state to an OFF state, the inductor L701 generates a voltage higher than the voltage V_CPU at the collector terminal of the transistor TR701 by self-induction. This voltage is transmitted to the secondary side via the capacitor C102, is amplified by the rectification circuit 25, which is a voltage doubler rectifier circuit of the switching circuit 20a, and is applied between the gate and source of the FET Q102. Observing this circuit while paying attention to the inductor L701, the transistor TR701, the diode D101, and the capacitor C101, it can be seen that this circuit is similar to the configuration of a common boost-type DC-DC converter.

In FIG. 2, the voltage that can be applied between the gate and source of the FET Q102 is about two times of the voltage V_CPU. However, in the circuit of FIG. 8, the voltage that is many times of the voltage V_CPU can be applied between the gate and source of the FET Q102 by changing the inductance value of the inductor L701, and the cycle and frequency of the pulse signal. Therefore, not only a MOSFET driven at 4V but also a MOSFET driven at 10V, etc. can be used as the FET Q102. Note that although the boost-type DC-DC converter has been mentioned, unlike a DC-DC converter as a power supply, it is hardly required for the boost-type DC-DC converter to have an ability to supply a current. Thus, instead of a large-sized inductor, a low-cost component such as a chip coil can be used for the inductor L701. Note that the additional configuration of Example 8 may be applied to the primary side of the switching circuit 10 of FIG. 1.

As described above, according to Example 7, the options for components used in the power supply apparatus can be increased, and simplification of the circuit and cost reduction can be achieved.

The power supply apparatuses described in Examples 3 to 6 to which the switching circuits of Examples 1, 2 and 7 are applied can be applied to, for example, an image forming apparatus. For example, the power supply apparatuses that generate a high voltage of the positive polarity or the negative polarity in Examples 3 and 4 can be applied as a high voltage power supply that requires a high voltage of each polarity for charging, development, transferring, etc. For example, the power supply apparatuses of Examples 5 and 6 can be applied as a power supply that supplies electric power to a low voltage power supply, i.e., a driving unit such as a controller (control unit) and a motor. Hereinafter, the configuration of an image forming apparatus to which these power supply apparatuses are applied will be described.

[Configuration of Image Forming Apparatus]

Figure 9:
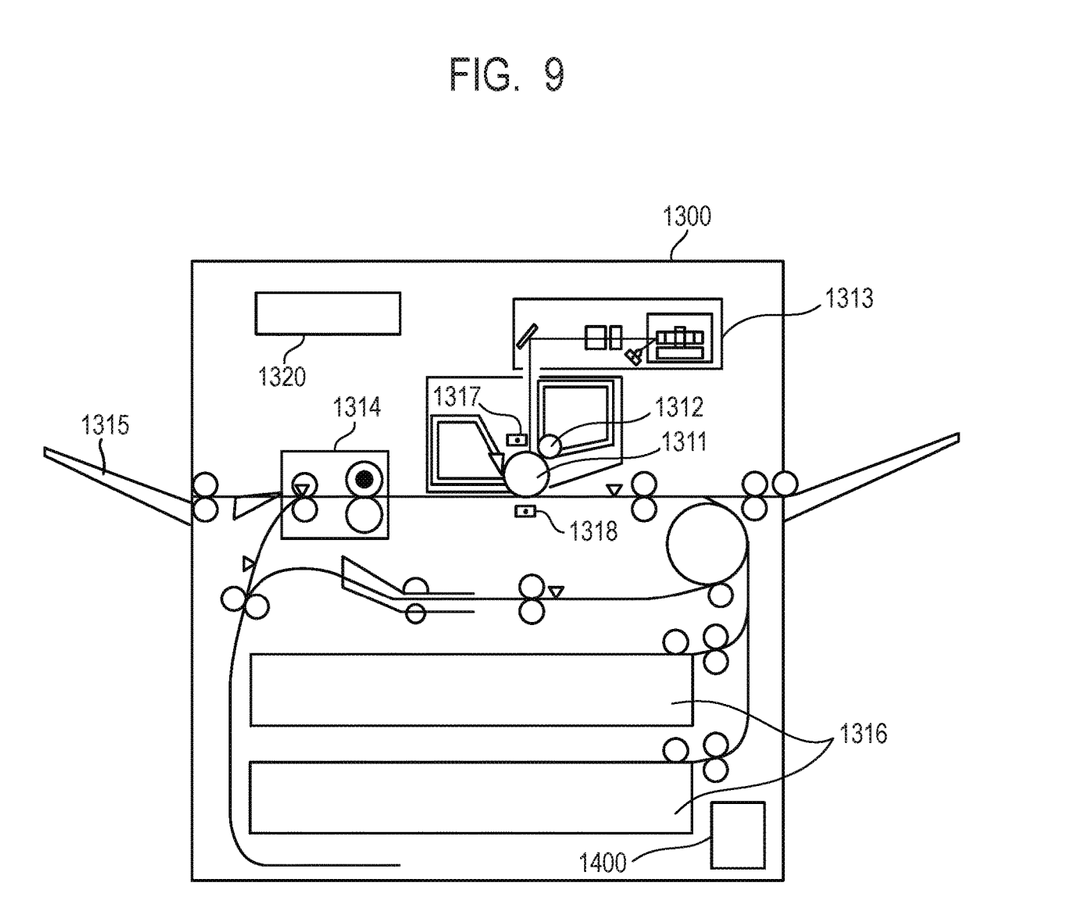
FIG. 9 is a diagram illustrating the configuration of an image forming apparatus of Example 8.

As an example of an image forming apparatus, a laser beam printer will be described as an example. FIG. 9 illustrates the schematic configuration of a laser beam printer, which is an example of the electrophotography printer. A laser beam printer 1300 includes an exposure unit 1313 (exposure device), a photosensitive drum 1311 as a photosensitive member on which an electrostatic latent image is formed, and a charge unit 1317 (charge device) that uniformly charges the photosensitive drum 1311. The laser beam printer 1300 includes a developing unit 1312 (developing device) that develops the electrostatic latent image formed on the photosensitive drum 1311 with a toner. Then, a toner image developed on the photosensitive drum 1311 is transferred by a transfer unit 1318 (transfer device) on a sheet (not illustrated) as a recording medium supplied from a cassette 1316, and the toner image transferred on the sheet is fixed by a fixing device 1314, and is discharged to a tray 1315. These photosensitive drum 1311, charge unit 1317, developing unit 1312, and transfer unit 1318 are an image forming unit. Additionally, the laser beam printer 1300 includes a power supply apparatus 1400. As described above, the power supply apparatus 1400 supplies a high voltage or a low voltage to each member of the image forming apparatus. Note that an image forming apparatus to which the power supply apparatus 1400 can be applied is not limited to the image forming apparatus exemplified in FIG. 9, and may be, for example, an image forming apparatus including a plurality of image forming units. Further, it may be an image forming apparatus including ae primary transfer unit that transfers the toner image on the photosensitive drum 1311 to an intermediate transfer belt, and a secondary transfer unit that transfers the toner image on the intermediate transfer belt to a sheet.

The laser beam printer 1300 includes a controller 1320 that controls an image forming operation by the image forming unit, and a conveying operation of a sheet, and the power supply apparatus 1400 supplies electric power to, for example, the controller 1320. Additionally, the power supply apparatus 1400 supplies electric power to a driving unit such as a motor for rotating the photosensitive drum 1311 or for driving various rollers, etc. for conveying a sheet. Further, the power supply apparatus 1400 supplies a high voltage to the charge unit 1317, the developing unit 1312, and the transfer unit 1318.

Additionally, for example, in a case where the all-night power supply 610 and the non-all-night power supply 630 of Example 6 are applied to the laser beam printer 1300, the laser beam printer 1300 has the following configuration. The laser beam printer 1300 can be operated in a power saving state (for example, a power saving mode and a waiting mode) that reduces the electric power to be consumed than during an image forming operation. The all-night power supply 610 is connected to, for example, the controller 1320, etc. as a second load. The non-all-night power supply 630 is connected to, for example, a member serving for the image forming operation as a first load. When the laser beam printer 1300 is operating in the power saving state, the electric power supply to the non-all-night power supply 630 is cut off by the switching circuit 10. On the other hand, when the laser beam printer 1300 is operating in a state (image forming mode) of performing the usual image forming operation, electric power is supplied to the non-all-night power supply 630 by the switching circuit 10. The CPU of Example 6 is in a first state that supplies electric power to the first load from the non-all-night power supply 630 by turning ON the FET Q101 at the time of the image forming mode. The CPU is controlled to be in a second state that cuts off supplying of the electric power to the first load from the non-all-night power supply 630 by turning OFF the FET Q101 at the time of the power saving mode. Note that the CPUs of the switching circuits 10 and 20 may be a CPU included in the controller 1320.

As described above, according to Example 8, the options for components used in the power supply apparatus can be increased, and simplification of the circuit and cost reduction can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-110789, filed Jun. 14, 2019, which is hereby incorporated by reference herein in its entirety.

What is claimed is:

1. A switching circuit comprising:
a first capacitor connected to a control unit, a pulse signal output from the control unit being input to the first capacitor;
a rectification circuit including at least a first diode and a second diode, the rectification circuit rectifying a voltage input from the first capacitor, and generating a first voltage higher than a peak voltage of the pulse signal;
a first switching element including a first terminal, a second terminal and a third terminal, the first voltage generated by the rectification circuit being applied between the first terminal and the second terminal;
an inductor connected to a side to which the pulse signal of the first capacitor is input and
a second switching element configured to supply a current flowing to the inductor to the first capacitor or to cut off the current.

2. A switching circuit according to claim 1, wherein the first switching element is a MOS field effect transistor, and wherein the first terminal is a gate terminal, the second terminal is a source terminal, and the third terminal is a drain terminal.

3. A switching circuit according to claim 1, wherein the first switching element is a bipolar transistor, and the first terminal is a base terminal, the second terminal is an emitter terminal, and the third terminal is a collector terminal.

4. A power supply apparatus comprising:
a control unit;
a switching circuit including a first capacitor connected to the control unit, a pulse signal output from the control unit being input to the first capacitor;
a rectification circuit including at least a first diode and a second diode, the rectification circuit rectifying a voltage input from the first capacitor, and generating a first voltage higher than a peak voltage of the pulse signal; and
a first switching element including a first terminal, a second terminal and a third terminal, the first voltage generated by the rectification circuit being applied between the first terminal and the second terminal, the first switching element configured to be turned on or off by the control unit;
a first power supply including a transformer having a primary winding and a secondary winding, and a rectifying and smoothing unit connected to the secondary winding;
a first Zener diode group connected to the rectifying and smoothing unit, the first Zener diode group including a plurality of Zener diodes; and a second Zener diode group connected to the first Zener diode group in series, the second Zener diode group including a plurality of Zener diodes, wherein the third terminal is connected to a first connection point between the first power supply and a cathode terminal of the first Zener diode group so that a first output voltage is output from the first connection point, and wherein the second terminal is connected to a second connection point between the first Zener diode group and the second Zener diode group so that a second output voltage is output from the second connection point.

5. A power supply apparatus according to claim 4, wherein the control unit controls the first output voltage to be substantially the same potential as the second output voltage by turning ON the first switching unit, and controls the first output voltage to be a potential higher than the second output voltage by turning OFF the first switching unit.

6. A power supply apparatus comprising:
a switching circuit including:
a first capacitor connected to a control unit, a pulse signal output from the control unit being input to the first capacitor;
a rectification circuit including at least a first diode and a second diode, the rectification circuit rectifying a voltage input from the first capacitor, and generating a first voltage higher than a peak voltage of the pulse signal; and
a first switching element including a first terminal, a second terminal and a third terminal, the first voltage generated by the rectification circuit being applied between the first terminal and the second terminal;
a second power supply including a transformer including a primary winding and a secondary winding, and a rectifying and smoothing unit connected to the secondary winding; and
a Zener diode group connected to the rectifying and smoothing unit, the Zener diode group including a plurality of Zener diodes,
wherein the second terminal is connected to a cathode terminal of the Zener diode group, and a third output voltage is output from a connection point between an anode terminal of the Zener diode group and the second power supply.

7. A power supply apparatus according to claim 6, wherein a second voltage having substantially the same potential as the peak voltage is supplied to the third terminal, and
the control unit controls the third output voltage to be a voltage obtained by subtracting a sum of Zener voltages of the Zener diode group from the second voltage, by turning ON the first switching unit, and controls the third output voltage to be a voltage output from the second power supply, by turning OFF the first switching unit.

8. A power supply apparatus comprising:
a switching circuit including:
a first capacitor connected to a control unit, a pulse signal output from the control unit being input to the first capacitor;
a rectification circuit including at least a first diode and a second diode, the rectification circuit rectifying a voltage input from the first capacitor, and generating a first voltage higher than a peak voltage of the pulse signal; and
a first switching element including a first terminal, a second terminal and a third terminal, the first voltage generated by the rectification circuit being applied between the first terminal and the second terminal;
a third power supply including a transformer including a primary winding and a secondary winding, a switching element connected to the primary winding in series, and a start-up resistor for starting a switching operation of the switching element,
wherein one end of the start-up resistor is connected to a beginning of the primary winding, and another end of the start-up resistor is connected to the third terminal, and
wherein the second terminal is connected to a control terminal of the switching element.

9. A power supply apparatus according to claim 8, wherein the control unit controls the first switching unit to be turned ON at a time of start-up of the third power supply, and controls the first switching unit to be tuned OFF after the third power supply is started up.

10. A power supply apparatus comprising:
a switching circuit including:
a first capacitor connected to a control unit, a pulse signal output from the control unit being input to the first capacitor;
a rectification circuit including at least a first diode and a second diode, the rectification circuit rectifying a voltage input from the first capacitor, and generating a first voltage higher than a peak voltage of the pulse signal; and
a first switching element including a first terminal, a second terminal and a third terminal, the first voltage generated by the rectification circuit being applied between the first terminal and the second terminal;
a fourth power supply configured to convert AC voltage of an AC power supply to DC voltage, and to supply the DC voltage to a first load; and
a fifth power supply configured to convert the AC voltage to DC voltage, and to supply the DC voltage to a second load,
wherein the second terminal is connected to the AC power supply, and the third terminal is connected to the fourth power supply.

11. A power supply apparatus according to claim 10, wherein the control unit controls the power supply apparatus to be in a first state in which electric power is supplied to the first load from the fourth power supply by turning ON the first switching unit, and controls the power supply apparatus to be in a second state in which the electric power to the first load from the fourth power supply is cut off by turning OFF the first switching unit, wherein the electric power in the second state is consumed less than the electric power in the first state.

* * * * *